United States Patent
Kang et al.

(10) Patent No.: US 10,011,281 B1
(45) Date of Patent: Jul. 3, 2018

(54) LANE CHANGE DEVICE, SYSTEM INCLUDING THE SAME, AND METHOD THEREOF

(71) Applicant: Hyundai Motor Company, Seoul (KR)

(72) Inventors: Min Chul Kang, Gyeonggi-Do (KR); Min Kyun Yoo, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/499,522

(22) Filed: Apr. 27, 2017

(30) Foreign Application Priority Data

Mar. 14, 2017 (KR) ........................ 10-2017-0031861

(51) Int. Cl.
| | | |
|---|---|---|
| *B60W 30/18* | (2012.01) | |
| *B60W 50/08* | (2012.01) | |
| *G08G 1/16* | (2006.01) | |
| *H04L 12/40* | (2006.01) | |

(52) U.S. Cl.
CPC .... *B60W 30/18163* (2013.01); *B60W 50/082* (2013.01); *G08G 1/167* (2013.01); *B60W 2550/302* (2013.01); *B60W 2550/308* (2013.01); *B60W 2720/106* (2013.01); *B60W 2720/24* (2013.01); *H04L 12/40* (2013.01); *H04L 2012/40215* (2013.01)

(58) Field of Classification Search
CPC ......... B60W 30/18163; B60W 50/082; B60W 2550/302; B60W 2550/308; B60W 2720/106; G08G 1/167; H04L 12/40; H04L 2012/40215
See application file for complete search history.

(56) References Cited

U.S. PATENT DOCUMENTS

| | | | |
|---|---|---|---|
| 2003/0187578 A1 | 10/2003 | Nishira et al. | |
| 2003/0234127 A1 | 12/2003 | Sudou et al. | |
| 2013/0226431 A1 | 8/2013 | Lu et al. | |
| 2016/0091896 A1* | 3/2016 | Maruyama | ............ B60W 10/04 701/23 |

FOREIGN PATENT DOCUMENTS

| | | |
|---|---|---|
| JP | 2008-044561 A | 2/2008 |
| JP | 2009-274594 A | 11/2009 |
| JP | 2013-109446 A | 6/2013 |
| JP | 2015-225384 A | 12/2015 |
| KR | 10-1439017 | 10/2014 |

* cited by examiner

*Primary Examiner* — Aaron L Troost
(74) *Attorney, Agent, or Firm* — Mintz Levin Cohn Ferris Glovsky and Popeo, P.C.; Peter F. Corless

(57) ABSTRACT

A lane change device, a system including the same, and a method thereof are provided. The lane change system includes a sensor unit that senses a rotational angular velocity of a turn signal lever of a subject vehicle, an electric field signal of a gear lever of the subject vehicle, and distances between the subject vehicle and neighboring vehicles. A processor then sets a driving mode using the rotational angular velocity, the electric field signal, and the distances between the subject vehicle and the neighboring vehicles, generates a lane change path based on the driving mode, and executes a lane change of the subject vehicle.

20 Claims, 21 Drawing Sheets

LANE CHANGE DEVICE, SYSTEM INCLUDING THE SAME, AND METHOD THEREOF

CROSS-REFERENCE TO RELATED APPLICATION

This application is based on and claims the benefit of priority to Korean Patent Application No. 10-2017-0031861, filed on Mar. 14, 2017, in the Korean Intellectual Property Office, the disclosure of which is incorporated herein in its entirety by reference.

TECHNICAL FIELD

The present disclosure relates to a lane change device, a system including the same, and a method thereof and, more particularly, to a technology for automatically setting a driving mode using a sensor of a gear lever and changing lanes differently based on the set driving mode.

BACKGROUND

While a vehicle is being driven on a road, a driver changes road lanes based on road conditions or travelling directions. When changing lanes, the driver should check the state of other surrounding vehicles and the presence or absence of obstacles using left and right side-view and rear-view mirrors mounted on the vehicle, and execute a lane change when there is a clear gap and no risk of collisions with the other vehicles. A system for supporting an automatic lane change has been developed and applied to vehicles.

Further, a driving style varies according to a driver's personal disposition, but a currently proposed lane change control has been applied to vehicles based on uniform time and distance from a start time of the lane change control after a switch for lane change is turned on as illustrated in FIG. 1 of the prior art in the light of safety such as a safe distance from a vehicle approaching from behind rather than the driver's disposition, to a completion time thereof, irrespective of the driver's intention. Thus, such a lane change control may make aggressive drivers feel frustrated or could be perceived as too aggressive by more passive drivers according to the driver's disposition, making the drivers uncomfortable.

SUMMARY

The present disclosure provides a lane change device, a system including the same, and a method thereof for executing a lane change based on a driver intention by understanding and reflecting the intention through a sensor mounted to a gear lever when the driver attempts to change lanes while driving the vehicle. The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a lane change system may include: a sensor unit configured to sense a rotational angular velocity of a turn signal lever of a subject vehicle, an electric field signal of a gear lever of the subject vehicle, and distances of the subject vehicle from neighboring or surrounding vehicles; and a processor configured to set a driving mode using the rotational angular velocity, the electric field signal, and the distances of the subject vehicle from the neighboring vehicles, which are sensed by the sensor unit, generate a lane change path based on the driving mode, and executing a lane change of the subject vehicle.

The sensor unit may include: an angular velocity sensor configured to sense the rotational angular velocity of the turn signal lever; and an electric field signal sensor configured to sense the electric field signal generated due to an operator's contact with the gear lever. The angular velocity sensor may be mounted within the turn signal lever, and the electric field signal sensor may be mounted in the gear lever. The sensor unit may further include an omnidirectional sensor configured to sense speeds of the neighboring vehicles traveling ahead, behind, and to the side of the subject vehicle and distances of the subject vehicle from the neighboring vehicles. The driving mode may be divided into a first driving mode in which a rapid lane change is executed, a second driving mode in which a lane change slower than that in the first driving mode is executed, and a third driving mode in which a lane change slower than that in the second driving mode is executed.

The processor may include: a driving mode setting unit configured to set the driving mode using the rotational angular velocity, the electric field signal, and sensing results of the omnidirectional sensor; a lane change path generating unit configured to generate a lane change path based on the driving mode; and a lane change controller configured to execute the lane change based on the lane change path. The driving mode setting unit may be configured to set the first driving mode when the rotational angular velocity is greater than or equal to a first reference value, and set the second driving mode when the rotational angular velocity is greater than or equal to a second reference value and is less than the first reference value.

Further, the driving mode setting unit may be configured to set the first driving mode when a period of time for which the electric field signal is generated is less than a third reference value, and set the second driving mode when the period of time for which the electric field signal is generated is greater than or equal to the third reference value and is less than a fourth reference value. The driving mode setting unit may then be configured to calculate a probability of a collision and a lane change allowable time based on the sensing results of the omnidirectional sensor including the speeds of the neighboring vehicles ahead, behind, and to the side of the subject vehicle on a target lane to be changed and the distances of the subject vehicle from the neighboring vehicles, and set the first driving mode when the probability of the collision is high and the lane change allowable time is short.

The driving mode setting unit may be configured to set the third driving mode when the rotational angular velocity is greater than or equal to the second reference value, when the period of time for which the electric field signal is generated is greater than or equal to the fourth reference value, or when the probability of the collision is low and the lane change allowable time is long in light of the sensing results of the omnidirectional sensor. The driving mode setting unit may also be configured to determine a driver intention using the rotational angular velocity and the electric field signal, and set the driving mode by prioritizing the driver intention over the sensing results of the omnidirectional sensor.

The driving mode setting unit may be configured to determine the driving mode by sensing a contact time for which the operator touches or engages the gear lever using the period of time for which the electric field signal is generated. The driving mode setting unit may be configured to set the first driving mode when the period of time for which the electric field signal is generated is short, set the second driving mode when the period of time for which the electric field signal is generated is longer than that in the first driving mode, and set the third driving mode when the period of time for which the electric field signal is generated is longer than that in the second driving mode.

According to another aspect of the present disclosure, a lane change device may include: a driving mode setting unit configured to set a driving mode using a rotational angular velocity of a turn signal lever, an electric field signal of a gear lever, and a probability of a collision with a neighboring vehicle; a lane change path generating unit configured to generate a lane change path based on the driving mode; and a lane change controller configured to execute a lane change based on the lane change path. The driving mode may be divided into a first driving mode in which a rapid lane change is executed, a second driving mode in which a lane change slower than that in the first driving mode is executed, and a third driving mode in which a lane change slower than that in the second driving mode is executed.

According to another aspect of the present disclosure, a lane change method may include: receiving a rotational angular velocity of a turn signal lever, an electric field signal generated when a gear lever is operated or engaged by an operator, and omnidirectional sensing data; setting a driving mode using the rotational angular velocity, the electric field signal, and the omnidirectional sensing data; generating a lane change path based on the driving mode; and executing a lane change based on the lane change path. The driving mode may be set by dividing the driving mode into a first driving mode in which a rapid lane change is executed, a second driving mode in which a lane change slower than that in the first driving mode is executed, and a third driving mode in which a lane change slower than that in the second driving mode is executed.

The setting of the driving mode may include setting the first driving mode when the rotational angular velocity is greater than or equal to a first reference value and setting the second driving mode when the rotational angular velocity is greater than or equal to a second reference value and is less than the first reference value. Additionally, the setting of the driving mode may include setting the first driving mode when a period of time for which the electric field signal is generated is less than a third reference value and setting the second driving mode when the period of time for which the electric field signal is generated is greater than or equal to the third reference value and is less than a fourth reference value.

The setting of the driving mode may include calculating a probability of a collision and a lane change allowable time based on the omnidirectional sensing data including speeds of neighboring vehicles traveling ahead, behind, and to the side of a subject vehicle on a target lane to be changed and distances of the subject vehicle from the neighboring vehicles, and setting the first driving mode when the probability of the collision is high and the change allowable time is short.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
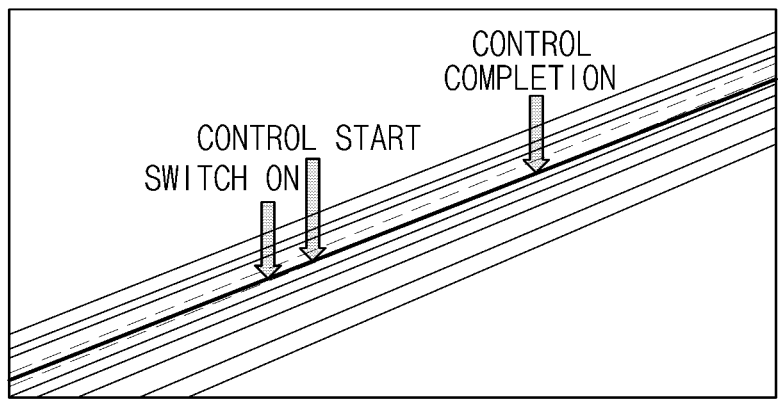
FIG. 1 illustrates an example of a general lane change according to the prior art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings. In the drawings, the same reference numerals will be used throughout to designate the same or equivalent elements. In addition, a detailed description of a related known function or configuration will be ruled out in order not to unnecessarily obscure the gist of the present disclosure. Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
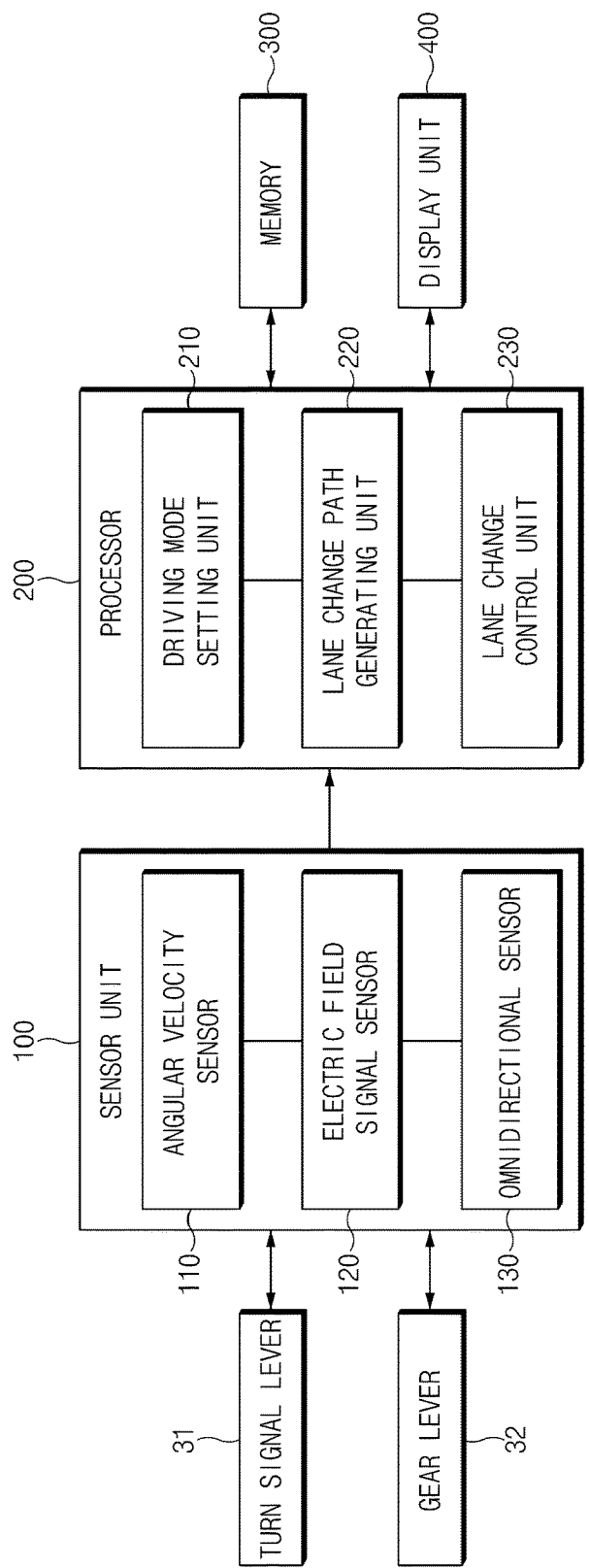
FIG. 2 illustrates the configuration of a lane change system, according to exemplary embodiments of the present disclosure.

Hereinafter, exemplary embodiments of the present disclosure will be described in detail with reference to FIGS. 2 to 11. FIG. 2 illustrates the configuration of a lane change system, according to exemplary embodiments of the present disclosure. The lane change system, according to the exemplary embodiments of the present disclosure, includes a sensor unit 100, a processor 200, a memory 300, and a display unit 400. The processor 200 and the memory 300 may be part of a controller configured to operate the other components of the system.

Particularly, the sensor unit 100 may be configured to sense a rotational angular velocity of a vehicle, a contact time of an operator's hand touching a gear lever (not shown), that is, time of manipulation of the gear lever, and distances of the vehicle (e.g., subject vehicle) from other vehicles traveling or located ahead, behind, and to the side thereof, and provide the sensing results to the processor 200. The sensor unit 100 may include an angular velocity sensor 110, an electric field signal sensor 120, and an omnidirectional sensor 130.

Figure 3:
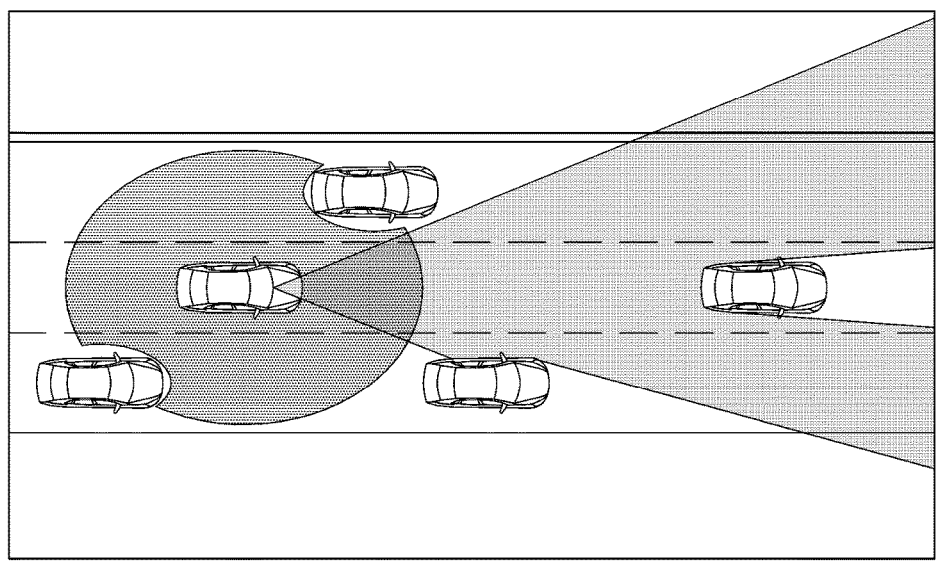
FIG. 3 illustrates an example of a sensing range of an omnidirectional sensor during lane changes, according to exemplary embodiments of the present disclosure.

The angular velocity sensor 110 may be mounted within a turn signal lever 31 of the vehicle, and may be configured to sense a rotational angular velocity of the vehicle, and provide the sensing result to the processor 200. The electric field signal sensor 120 may be mounted within a gear lever 32 of the vehicle, and may be configured to sense an electric field signal generated when the operator's hand touches the gear lever or a manipulation of the gear lever, and provide the sensing result to the processor 200. The omnidirectional sensor 130 may be configured to detect other vehicles traveling or located ahead, behind, and to the sides of the subject vehicle, sense distances between the subject vehicle and the other vehicles, and provide the sensing results to the processor 200. FIG. 3 illustrates an example of a sensing range of the omnidirectional sensor during lane changes, according to exemplary embodiments of the present disclosure.

Further, the processor 200 may be configured to set a driving mode using the rotational angular velocity of the turn signal lever, the electric field signal of the gear lever, and the omnidirectional sensing data received from the sensor unit 100, generate a lane change path at a speed based on the set driving mode, and execute a lane change. Particularly, the processor 200 may include a driving mode setting unit 210, a lane change path generating unit 220, and a lane change controller 230. In the exemplary embodiments of the present disclosure, the driving mode is divided into a first mode (sport mode) for executing high speed driving, a second mode (normal mode) for executing intermediate speed driving, and a third mode (eco mode) for executing low speed driving. The high speed is over 70 mph, the intermediate speed is 55-70 mph, the low speed is below 55 mph.

The driving mode setting unit 210 may be configured to set the sport mode for executing high speed driving when the rotational angular velocity of the turn signal lever 31 is greater than or equal to a predetermined first reference value, and when a period of time for which the electric field signal is generated (hereinafter also referral to as the "electric field signal generating time") is less than a predetermined third reference value. In other words, when the rotational angular velocity of the turn signal lever 31 is high, the processor may be configured to determine that the driver has an intention to change lanes rapidly since the driver operates the turn signal lever 31 rapidly, when the rotational angular velocity of the turn signal lever 31 is equal to an intermediate level, determine that the driver has an intention to change lanes at intermediate speed since the driver operates the turn signal lever 31 at intermediate speed, and when the rotational angular velocity of the turn signal lever 31 is low, determine that the driver has an intention to change lanes slowly since the driver operates the turn signal lever 31 slowly. The rotational angular velocity of the turn signal lever 31 may be tuned.

Figure 4A:
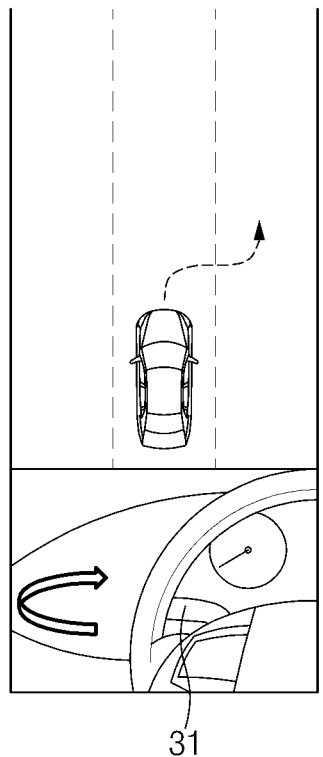
FIG. 4A illustrates an example of a lane change when a rotational angular velocity is high, according to exemplary embodiments of the present disclosure.
Figure 4B:
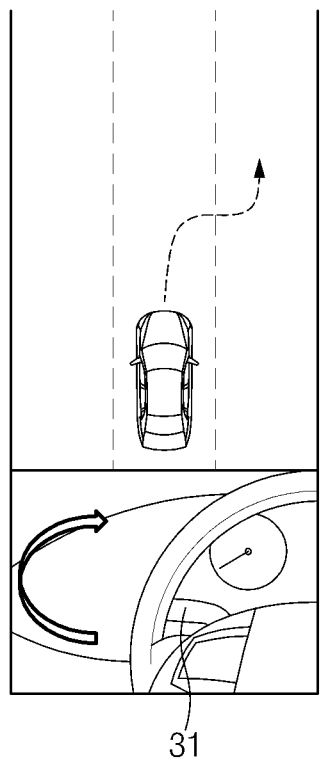
FIG. 4B illustrates an example of a lane change when a rotational angular velocity is equal to an intermediate level, according to exemplary embodiments of the present disclosure.
Figure 4C:
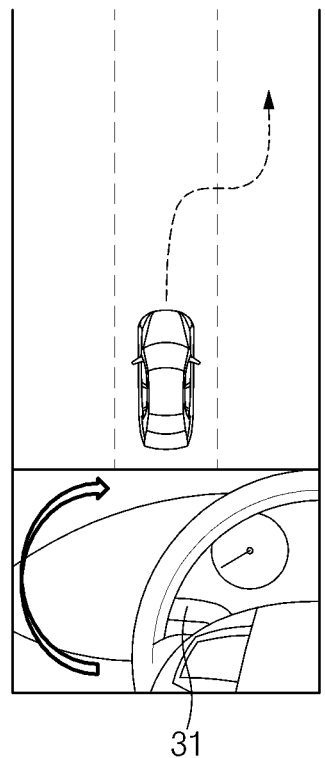
FIG. 4C illustrates an example of a lane change when a rotational angular velocity is low, according to exemplary embodiments of the present disclosure.
Figure 4D:
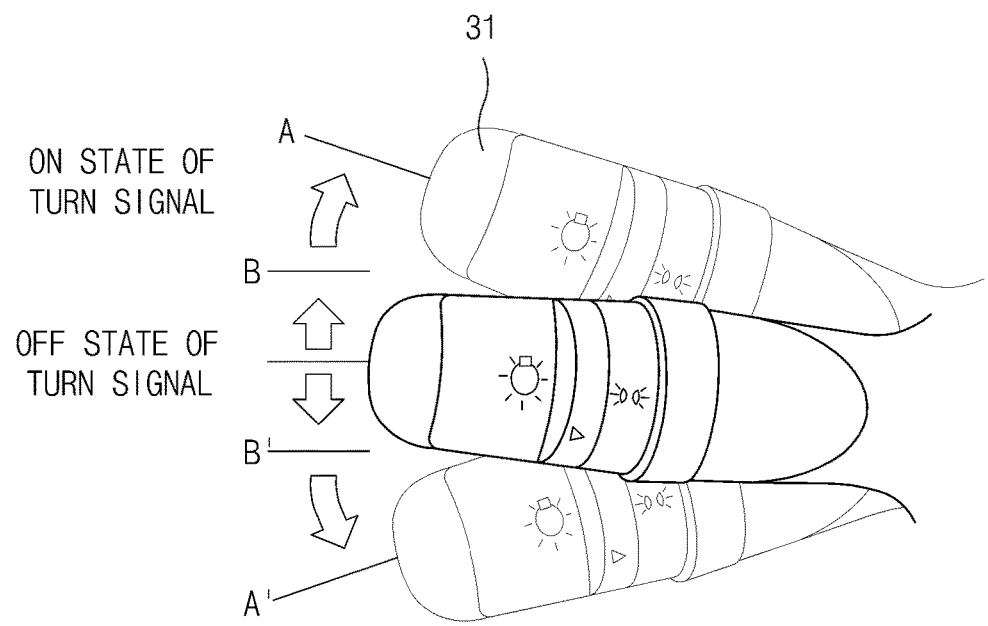
FIG. 4D illustrates on and off states of a turn signal lever, according to exemplary embodiments of the present disclosure.
Figure 4E:
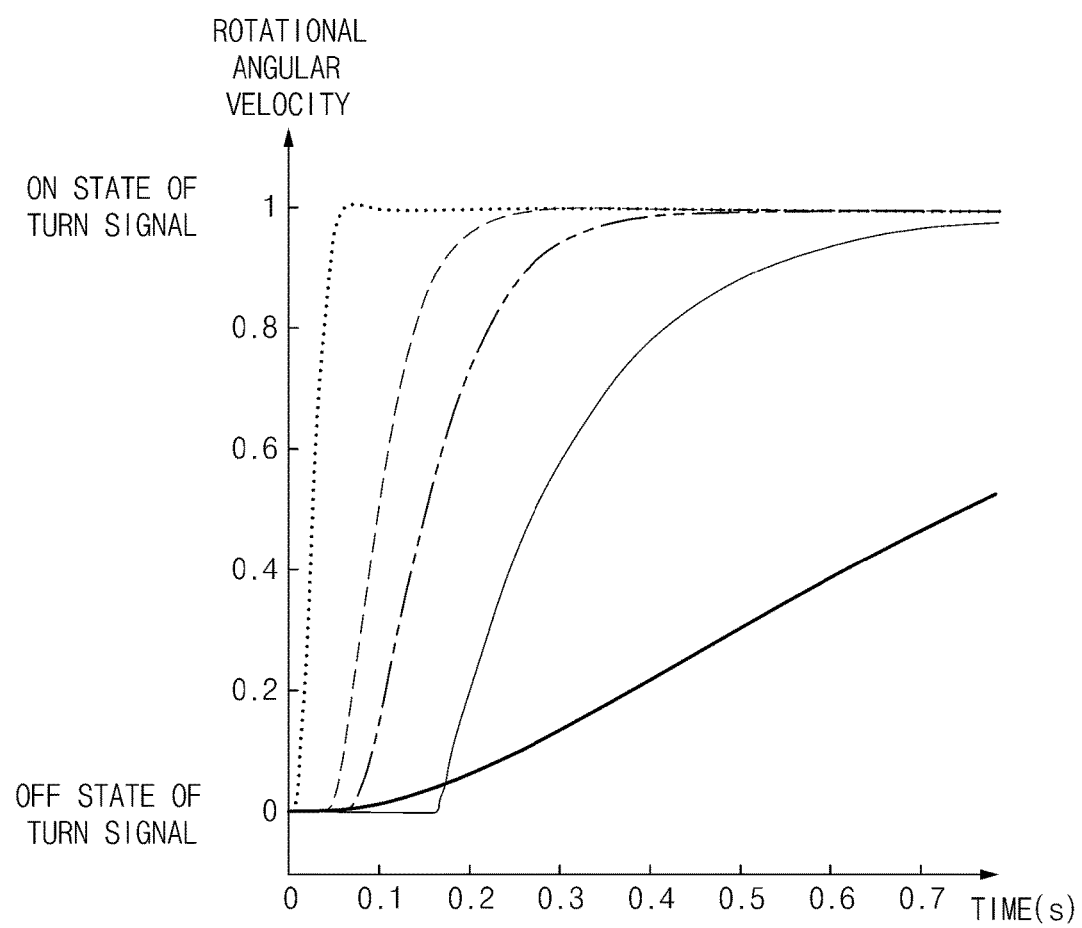
FIG. 4E illustrates examples of rotational angular velocities depending on on and off states of a turn signal lever, according to exemplary embodiments of the present disclosure.

FIG. 4A illustrates an example of a lane change when the rotational angular velocity of the turn signal lever 31 is high, according to exemplary embodiments of the present disclosure. FIG. 4B illustrates an example of a lane change when the rotational angular velocity of the turn signal lever 31 is equal to an intermediate level, according to exemplary embodiments of the present disclosure. FIG. 4C illustrates an example of a lane change when the rotational angular velocity of the turn signal lever 31 is low, according to exemplary embodiments of the present disclosure. FIG. 4D illustrates on and off states of the turn signal lever, according to exemplary embodiments of the present disclosure, in which the turn signal lever 31 is moved or manipulated upwards or downwards to be turned on or off, respectively. FIG. 4E illustrates examples of rotational angular velocities depending on the on and off states of the turn signal lever, according to exemplary embodiments of the present disclosure, and in particular, high, intermediate, and low levels of the rotational angular velocities when the turn signal lever 31 is manipulated to change from an off state to an on state.

In other words, the driving mode setting unit 210 may be configured to determine a period of time for which the operator holds the gear lever according to the electric field signal received from the electric field signal sensor 120. The electric field signal is generated while the operator is holding or manipulating the gear lever. When the electric field signal generating time is short, the period of time for which the operator holds the gear lever is short, and when the electric field signal generating time is long, the period of time for which the operator holds the gear lever is long. When the period of time for which the operator holds the gear lever is short, the processor may be configured to correlate the action with a rapid lane change, and when the period of time for which the operator holds the gear lever is long, that the processor may be configured to correlate the action with a slow lane change. The time periods for determining rapid and slow lane changes may be tuned.

In addition, the driving mode setting unit 210 may be configured to set the normal mode for executing intermediate speed driving, slower than the sport mode, when the rotational angular velocity of the turn signal lever 31 is less than the predetermined first reference value and is greater than or equal to a predetermined second reference value, and when the electric field signal generating time is greater than or equal to the predetermined third reference value and is less than a predetermined fourth reference value. The driving mode setting unit 210 may be configured to set the eco mode for executing low speed driving, slower than the normal mode, when the rotational angular velocity of the turn signal lever 31 is less than the predetermined second reference value, and when the electric field signal generating time is greater than or equal to the predetermined fourth reference value.

The driving mode setting unit 210 may be configured to predict the probability of collisions with other vehicles traveling or located ahead, behind, and to the side of the subject vehicle on a target lane to be changed (e.g., a target line into which the subject vehicle intends to enter) and an allowable time for lane change (hereinafter referred to as the "change allowable time") from the sensing data of the omnidirectional sensor 130. Additionally, the driving mode setting unit 210 may be configured to set the sport mode when the probability of collisions is high, set the eco mode when the probability of collisions is low, and set the normal mode when the probability of collisions is equal to an intermediate level. The driving mode setting unit 210 may be configured to set a high acceleration level of the vehicle for a rapid lane change when the sport mode is set, set a low acceleration level of the vehicle for a slow lane change when the eco mode is set, and set an intermediate acceleration level of the vehicle for an intermediate-speed lane change when the normal mode is set.

In other words, the driving mode setting unit 210 may be configured to determine a driver intention using the rotational angular velocity of the turn signal lever 31 and the electric field signal of the gear lever 32, and set a driving mode by prioritizing the driver intention over the sensing results of the omnidirectional sensor 130. Even when the subject vehicle is at a distance from neighboring vehicles considered safe or in which the probability of collisions is low as the neighboring vehicles are running at low speed in the light of the sensing results of the omnidirectional sensor 130, in response to determining that the driver intends to execute a rapid lane change based on the rotational angular speed of the angular velocity sensor 110 and the electric field signal of the electric field signal sensor 120, the lane change may be executed based on the sport mode.

However, even when the driver has no intention to change lanes rapidly when distances between the subject vehicle and neighboring vehicles are short or the probability of collisions is high as the neighboring vehicles are traveling at high speed, the driving mode setting unit 210 may be configured to set the sport mode to execute the rapid lane change while avoiding a collision.

Figure 5:
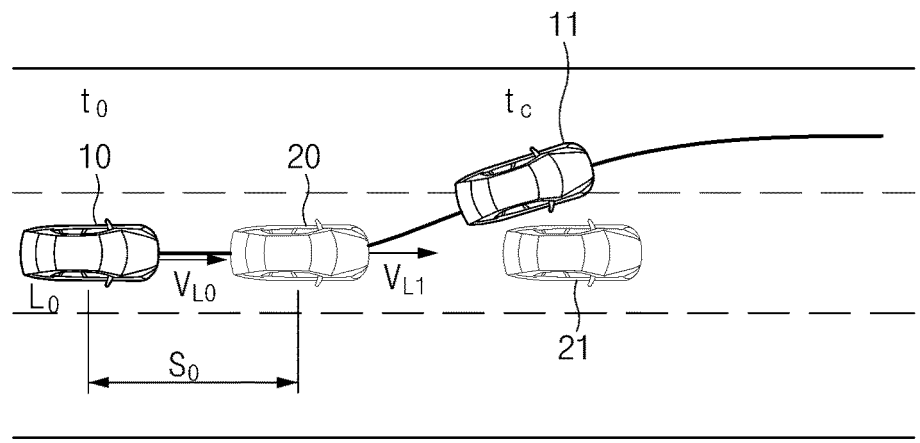
FIG. 5 illustrates an example of generating a lane change path, according to exemplary embodiments of the present disclosure.
Figure 6:
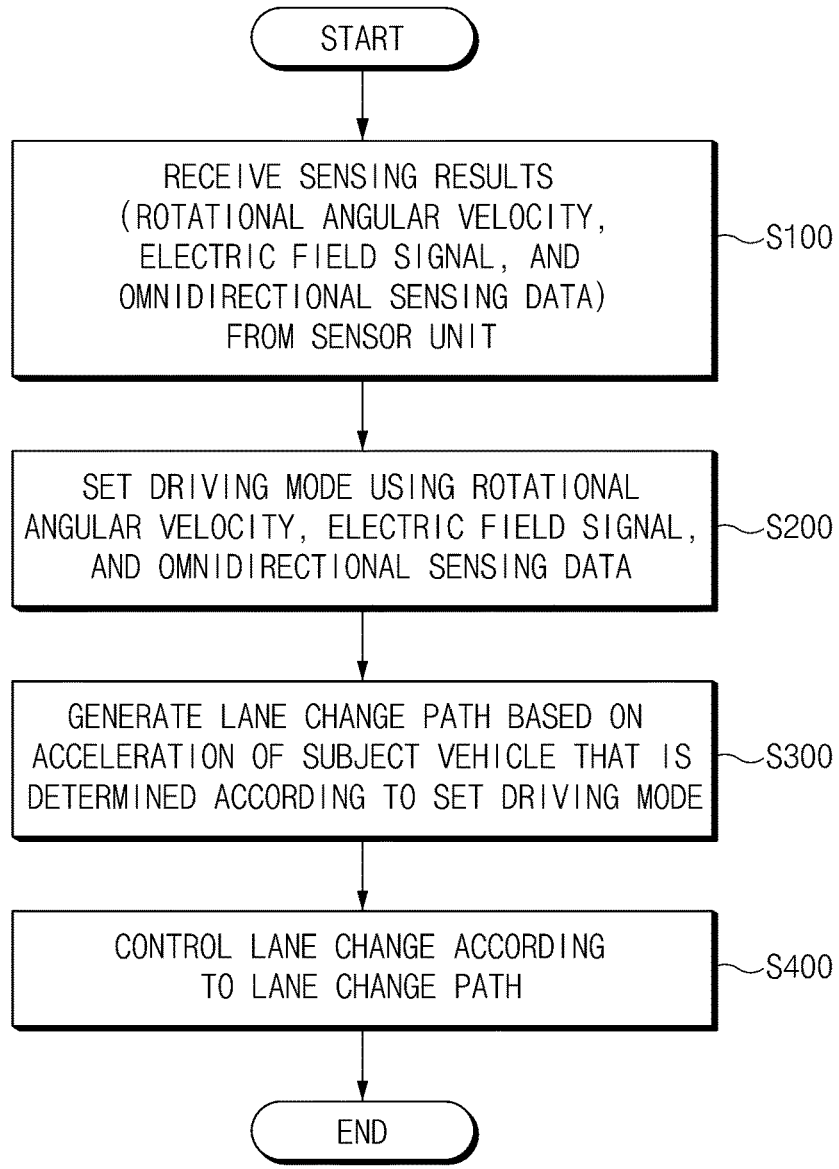
FIG. 6 illustrates a flowchart of a lane change method according to driving mode, according to exemplary embodiments of the present disclosure.

The lane change path generating unit 220 may be configured to generate a lane change path based on vehicle speeds to be set based on driving modes set by the driving mode setting unit 210. FIG. 5 illustrates an example of generating a lane change path, according to exemplary embodiments of the present disclosure. Equations 1 to 3 used for generating a lane change path will be defined as below.

$$s(t)=xL1(t)-xL2(t) \qquad \text{Equation 1}$$

wherein, $s(t)$ is a longitudinal distance between a subject vehicle 10 and a preceding vehicle 20. When the longitudinal distance is greater than 0, $s(t)>0$, a collision will not occur when changing to a target lane.

$$s(t) = s(0) + \int_0^t \int_0^\tau (aL1 - aL0)dt d\tau + (vL1(0) - vL0(0))t) > 0 \quad \text{Equation 2}$$

Since s(0)=xL1(0)−xL2((0), a final goal is to obtain an initial minimum value of s(0) where there will be no collision between two vehicles. The minimum value s(0) in a lane change without occurrence of a collision refers to a minimum initial longitudinal relative space between two vehicles L0 and L1, and this will be expressed as equation 3 below.

$$s(0) = \max\left\{\int_0^\tau \int_0^\tau (a_{L1} - a_{L0})dt d\tau + (v_{L1}(0) - v_{L0}(0)) \times t\right\} \quad \text{Equation 3}$$

wherein, s(0) is the minimum longitudinal safety distance between the subject vehicle 10 and the preceding vehicle 20, VL0 is a speed of the subject vehicle, VL1 is a speed of the preceding vehicle, aL0 is an acceleration of the subject vehicle, aL1 is an acceleration of the preceding vehicle, and t is a total amount of time for executing a lane change.

Referring to FIG. 5, L0 is the subject vehicle 10, L1 is the preceding vehicle 20, reference numeral 11 refers to a position of the subject vehicle 10 during the lane change, and reference numeral 21 refers to a position of the preceding vehicle 20 during the lane change. In other words, the figure shows that the minimum initial longitudinal relative space between two vehicles L0 and L1 depends on a relative longitudinal acceleration and an initial relative longitudinal velocity.

The lane change controller 230 may be configured to execute the lane change of the vehicle based on the lane change path. The memory 300 may be configured to store date calculated by the processor 200. The display unit 400 may be configured to display the lane change path and the driving mode on a screen within the vehicle. As described above, when the lane change path is generated, the lane change may be adjusted by prioritizing the driver intention as well as the probability of collisions with neighboring vehicles and the change allowable time, thus improving driver convenience.

In other words, even when the probability of collisions with neighboring vehicles is low and there is sufficient time to execute a lane change, when the driver intends to execute a rapid lane change, the driver intention may be determined by the sensor and the rapid lane change may be executed based on the intention, thus improving driver satisfaction. Hereinafter, a lane change method according to driving mode, according to exemplary embodiments of the present disclosure, will be described with reference to FIG. 6. The method described herein below may be executed by an overall controller as described above.

A lane change system may be configured to receive sensing results including a rotational angular velocity of the turn signal lever 31, an electric field signal of the gear lever 32, and omnidirectional sensing data from the sensor unit in S100. The lane change system may then be configured to set a driving mode using the rotational angular velocity of the turn signal lever 31, the electric field signal of the gear lever 32, and the omnidirectional sensing data in S200. Thereafter, the lane change system may be configured to generate a lane change path based on an acceleration of a subject vehicle determined according to the set driving mode in S300. The lane change system may then be configured to execute a lane change of the vehicle based on the generated lane change path in S500.

Figure 7:
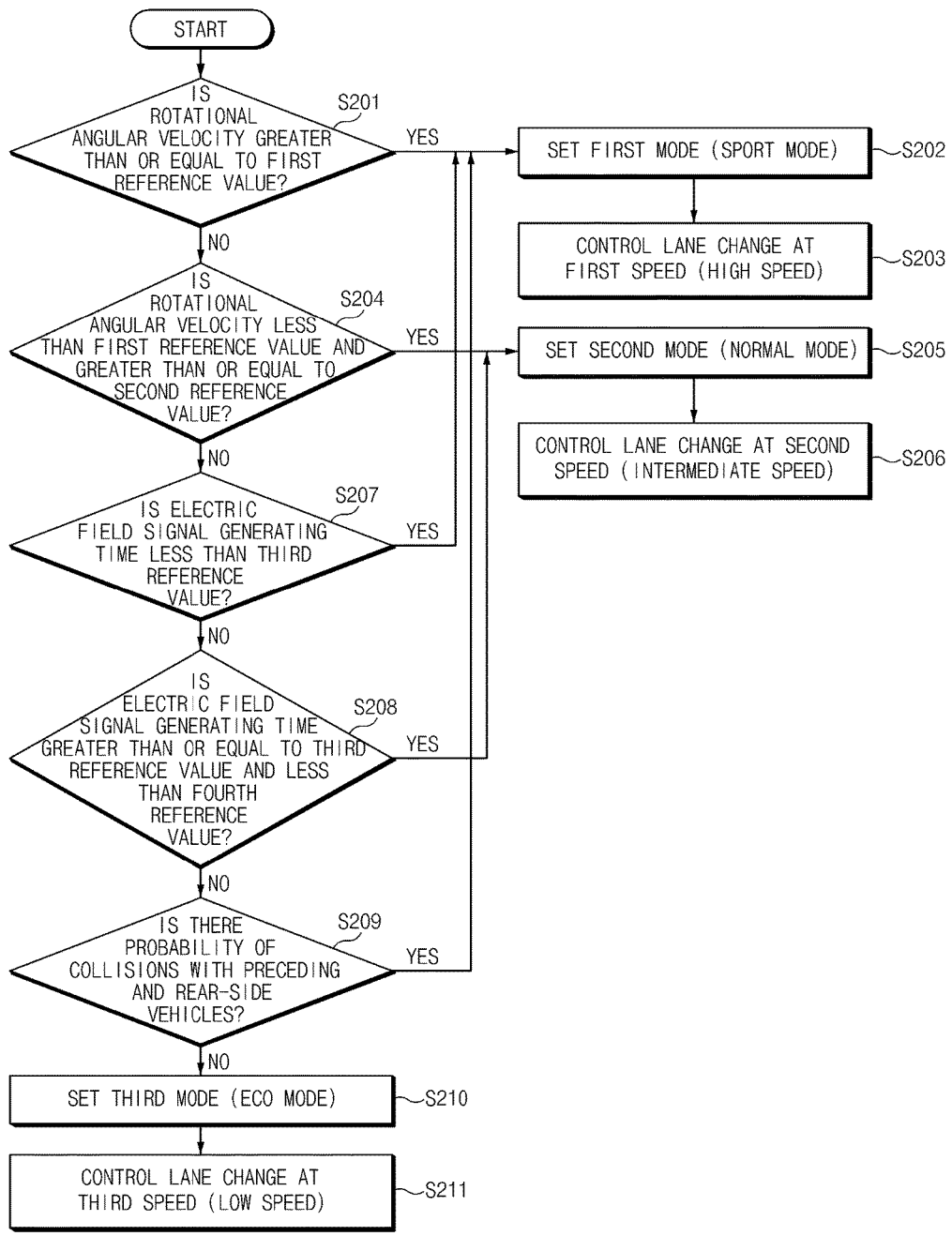
FIG. 7 illustrates a flowchart of a driving mode setting method using sensing results, according to exemplary embodiments of the present disclosure.

Hereinafter, a driving mode setting method using sensing results, according to exemplary embodiments of the present disclosure, will be described with reference to FIG. 7. A lane change system may be configured to determine whether a rotational angular velocity of the turn signal lever 31 is greater than or equal to a first reference value in S201, and may be configured to set a first mode as driving mode when the rotational angular velocity of the turn signal lever 31 is greater than or equal to the first reference value in S202. Thereafter, the lane change system may be configured to execute a lane change at a first speed based on the first mode in S203. In particular, the first mode is a sport mode in which a rapid lane change is executed, and the first speed is a high speed.

Meanwhile, unless the rotational angular velocity of the turn signal lever 31 is greater than or equal to the first reference value, the lane change system may be configured to determine whether the rotational angular velocity of the turn signal lever 31 is less than the first reference value and is greater than or equal to a second reference value in S204. When the rotational angular velocity of the turn signal lever 31 is less than the first reference value and is greater than or equal to a second reference value, the lane change system may be configured to set a second mode as driving mode in S205, and may be configured to execute a lane change at a second speed based on the second mode in S206. In particular, the second mode is a normal mode in which a lane change is executed at a speed slower than that in the first mode, and the second speed is set to be slower than the first speed.

Meanwhile, unless the rotational angular velocity of the turn signal lever 31 is less than the first reference value and is greater than or equal to the second reference value, the lane change system may be configured to determine that the rotational angular velocity is less than the second reference value, and determine whether an electrical field signal generating time is less than a third reference value in S207. When the electrical field signal generating time is less than the third reference value, the lane change system may be configured to determine whether the rotational angular velocity of the turn signal lever 31 is less than the first reference value and is greater than or equal to the second reference value in S204.

Unless the electrical field signal generating time is less than the third reference value, the lane change system may be configured to determine whether the electrical field signal generating time is greater than or equal to the third reference value and is less than a fourth reference value in S208. When the electrical field signal generating time is greater than or equal to the third reference value and is less than the fourth reference value, the lane change system may be configured to set the second mode as driving mode in S205, and may be configured to execute the lane change at the second speed based on the second mode in S206.

Meanwhile, unless the electrical field signal generating time is greater than or equal to the third reference value and is less than the fourth reference value, the lane change system may be configured to determine whether there is the probability of collisions with other vehicles traveling or located ahead, behind, and to the side of the subject vehicle based on the sensing results of the omnidirectional sensor in S209, set the first mode as driving mode when the probability of collisions is high (e.g., there is a significant risk of collision with a surrounding vehicle) and a change allowable time is short (e.g., less than a reference time period), and set a third mode as driving mode when the probability of collisions is low and the change allowable time is long (e.g., greater than the reference time period) in S210. Thereafter, the lane change system may be configured to execute a lane change at a third speed based on the third mode in S211. In particular, the third mode is an eco mode in which a lane change is executed at a speed slower than that in the second mode, and the third speed is set to be slower than the second speed. The reference time period may be tuned.

Figure 8A:
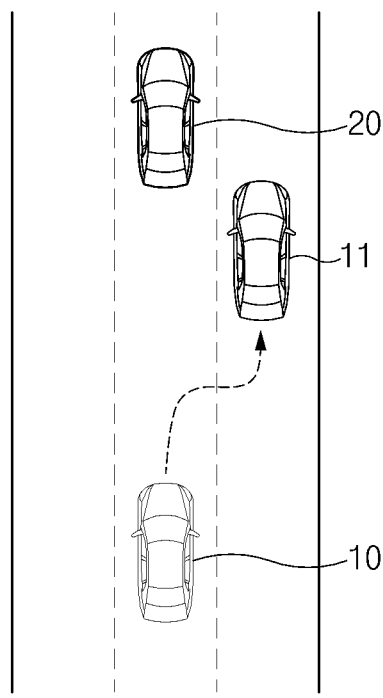
FIG. 8A illustrates an example of a lane change at low speed when a gap between a subject vehicle and a preceding vehicle is wide, according to exemplary embodiments of the present disclosure.

FIG. 8A illustrates an example of a lane change at low speed when a gap between a subject vehicle and a preceding vehicle is wide (e.g., the distance between the vehicle is sufficient to avoid a collision), according to exemplary embodiments of the present disclosure. In other words, when the gap between the subject vehicle 10 and the preceding vehicle 20 is wide, a change allowable time is long and the probability of a collision is low, and thus, the lane change may be executed slowly. Reference numeral 11 indicates a position of the subject vehicle when the lane change is completed.

Figure 8B:
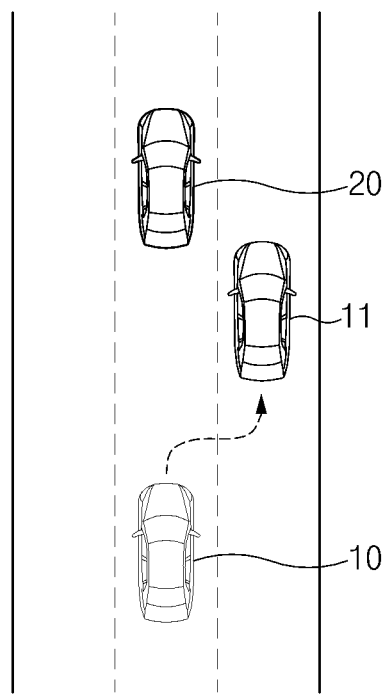
FIG. 8B illustrates an example of a lane change at high speed when a gap between a subject vehicle and a preceding vehicle is narrow, according to exemplary embodiments of the present disclosure.

FIG. 8B illustrates an example of a lane change at high speed when a gap between a subject vehicle and a preceding vehicle is narrow (e.g., there is insufficient distance between the vehicles), according to exemplary embodiments of the present disclosure. In other words, when the gap between the subject vehicle 10 and the preceding vehicle 20 is narrow, a change allowable time is short and the probability of a collision is high, and thus, the lane change may be executed rapidly.

Figure 8C:
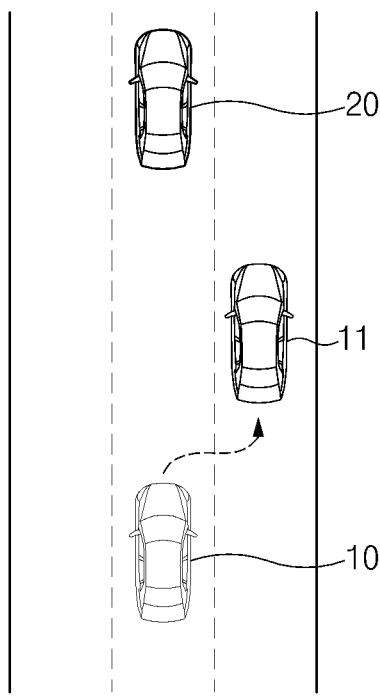
FIG. 8C illustrates an example of a lane change at high speed according to a driver intention when a gap between a subject vehicle and a preceding vehicle is wide, according to exemplary embodiments of the present disclosure.

FIG. 8C illustrates an example of a lane change at high speed according to a driver intention when a gap between a subject vehicle and a preceding vehicle is wide, according to exemplary embodiments of the present disclosure. In other words, FIG. 8C illustrates a rapid lane change based on the driver intention even when the probability of a collision is low as the gap between the subject vehicle 10 and the preceding vehicle 20 is wide.

Figure 9A:
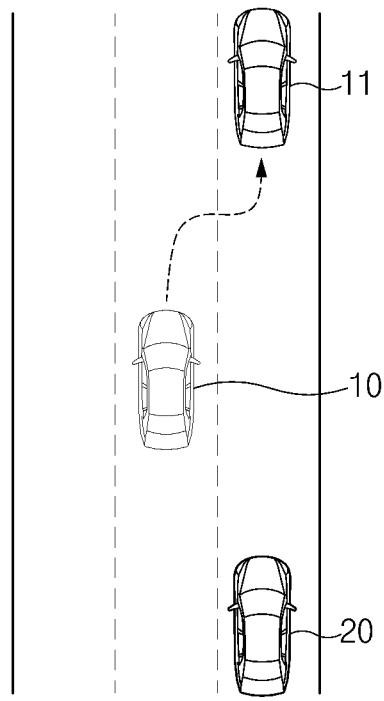
FIG. 9A illustrates an example of a lane change at low speed when a gap between a subject vehicle and a rear-side vehicle is wide, according to exemplary embodiments of the present disclosure.

FIG. 9A illustrates an example of a lane change at low speed when a gap between a subject vehicle and a rear-side vehicle is wide, according to exemplary embodiments of the present disclosure. Since the gap between the subject vehicle 10 and the rear-side vehicle 30 is wide, when a change allowable time is long and the probability of a collision is low, the lane change may be executed slowly.

Figure 9B:
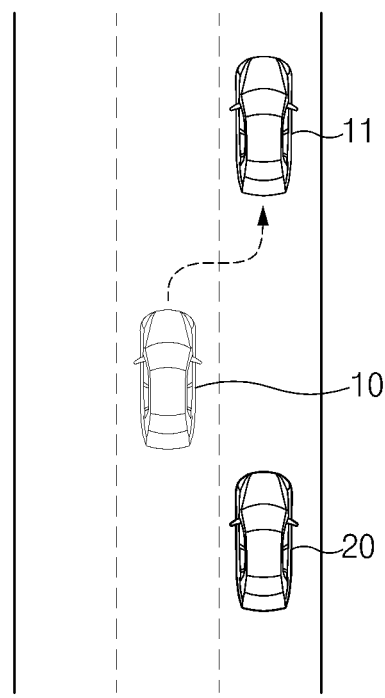
FIG. 9B illustrates an example of a lane change at high speed when a gap between a subject vehicle and a rear-side vehicle is narrow, according to exemplary embodiments of the present disclosure.

FIG. 9B illustrates an example of a lane change at high speed when a gap between a subject vehicle and a rear-side vehicle is narrow, according to exemplary embodiments of the present disclosure. Since the gap between the subject vehicle 10 and the rear-side vehicle 30 is narrow, when a change allowable time is short and the probability of a collision is high, the lane change may be executed rapidly.

Figure 9C:
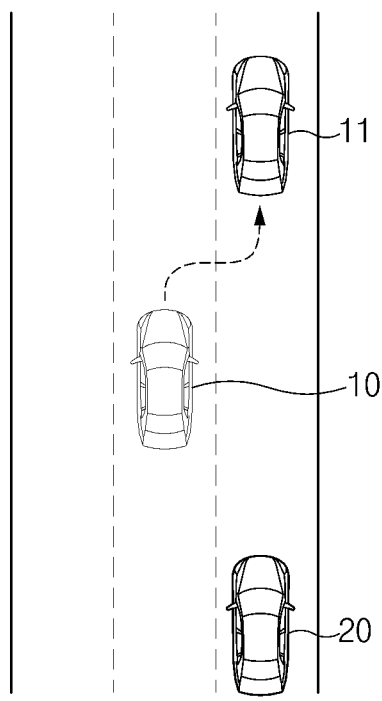
FIG. 9C illustrates an example of a lane change at high speed according to a driver intention when a gap between a subject vehicle and a rear-side vehicle is wide, according to exemplary embodiments of the present disclosure.

FIG. 9C illustrates an example of a lane change at high speed according to a driver intention when a gap between a subject vehicle and a rear-side vehicle is wide. In other words, FIG. 9C illustrates a rapid lane change according to the driver intention even when a change allowable time is long and the probability of a collision is low as the gap between the subject vehicle 10 and the rear-side vehicle 30 is wide.

Figure 10A:
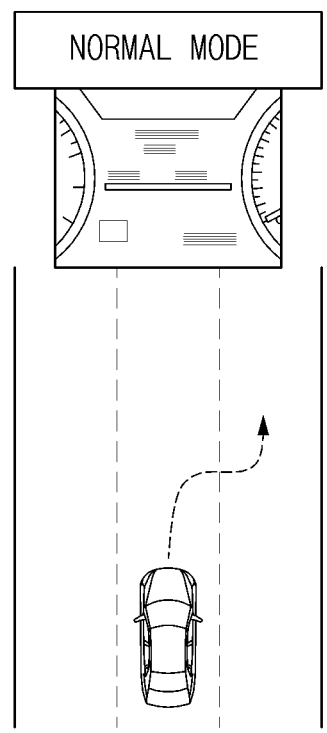
FIG. 10A illustrates an example of a display in normal mode, according to exemplary embodiments of the present disclosure.
Figure 10B:
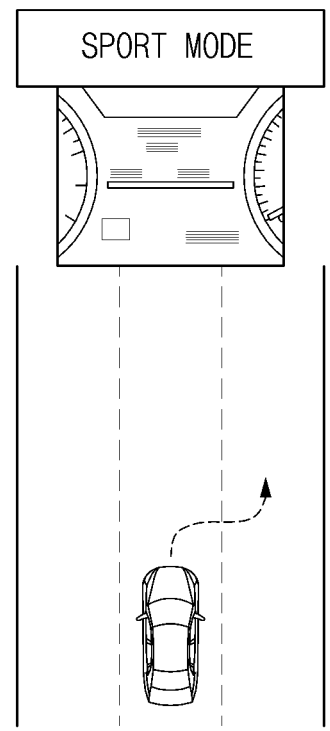
FIG. 10B illustrates an example of a display in sport mode, according to exemplary embodiments of the present disclosure.
Figure 10C:
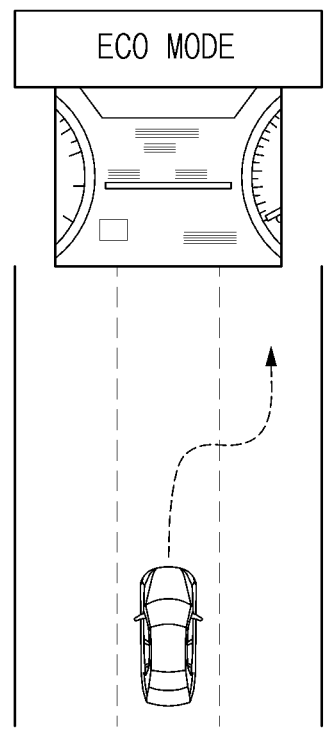
FIG. 10C illustrates an example of a display in eco mode, according to exemplary embodiments of the present disclosure.

FIG. 10A illustrates an example of a display in normal mode, according to exemplary embodiments of the present disclosure, and in particular, a lane change path in normal mode and the normal mode on display screen. FIG. 10B illustrates an example of a display in sport mode, according to exemplary embodiments of the present disclosure, and in particular, a lane change path in sport mode and the sport mode on display screen. FIG. 10C illustrates an example of a display in eco mode, according to exemplary embodiments of the present disclosure, and in particular, a lane change path in eco mode and the eco mode on display screen.

As described above, the lane change may be automatically executed based on the probability of collisions with neighboring vehicles. By setting the driving mode based on the driver intention determined by the sensor mounted in the gear lever and reflecting the set driving mode to execute a lane change speed, safe driving may be achieved while preventing collisions with the neighboring vehicles and improving driver satisfaction.

Figure 11:
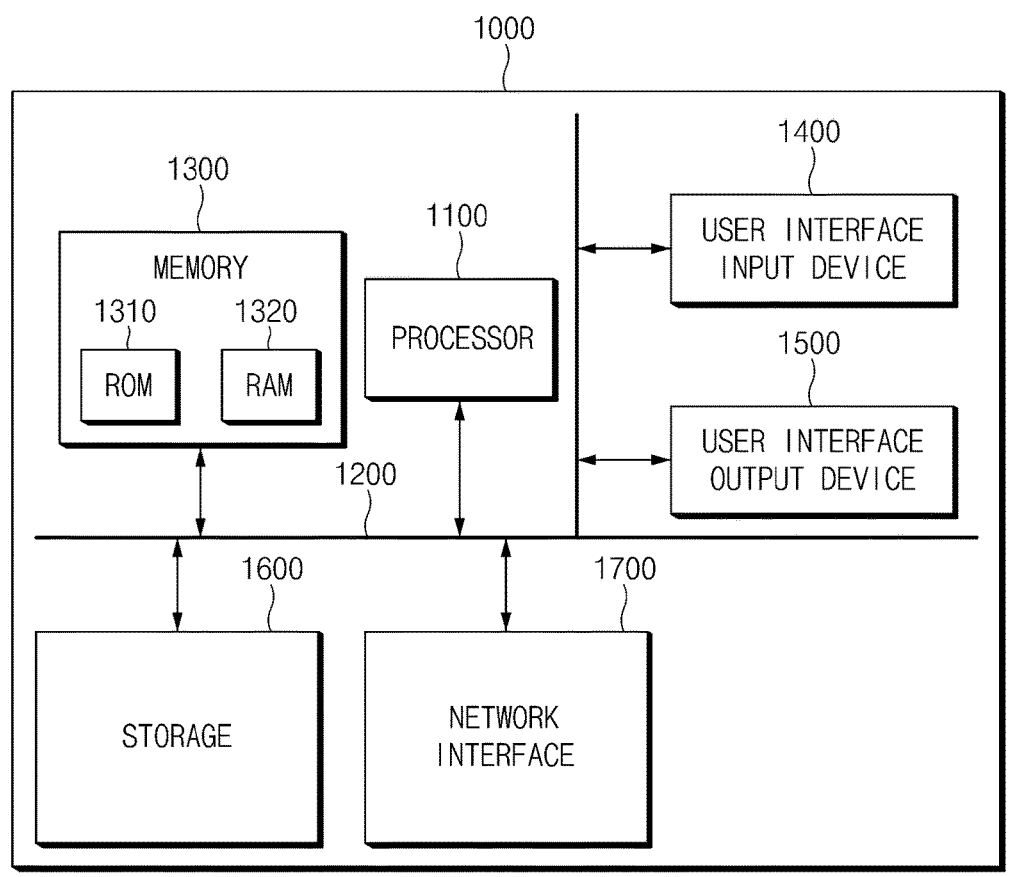
FIG. 11 illustrates the configuration of a computing system by which a lane change method according to driving mode according to exemplary embodiments of the present disclosure is executed.

FIG. 11 illustrates the configuration of a computing system by which a lane change method according to driving mode according to exemplary embodiments of the present disclosure is executed. Referring to FIG. 11, a computing system 1000 may include at least one processor 1100, a bus 1200, a memory 1300, a user interface input device 1400, a user interface output device 1500, a storage 1600, and a network interface 1700, wherein these elements may be connected via the bus 1200.

The processor 1100 may be a central processing unit (CPU) or a semiconductor device processing commands stored in the memory 1300 and/or the storage 1600. The memory 1300 and the storage 1600 include various types of volatile or non-volatile storage media. For example, the memory 1300 includes a read only memory (ROM) and a random access memory (RAM). Therefore, the steps of the method or algorithm described in connection with the exemplary embodiments disclosed herein may be implemented directly by a hardware module or a software module that is executed by the processor 1100, or a combination of both. The software module may reside in non-transitory storage media, i.e., the memory 1300 and/or the storage 1600, such as RAM, a flash memory, ROM, an erasable programmable read-only memory (EPROM), an electrically erasable programmable read-only memory (EEPROM), a register, a hard disk, a removable disk, and a CD-ROM.

The exemplary storage media may be coupled to the processor 1100, and accordingly, the processor 1100 may be configured to read information from the storage media and write information to the storage media. Alternatively, the storage media may be integrated with the processor 1100. The processor 1100 and the storage media may reside in an application specific integrated circuit (ASIC). The ASIC may reside in a user terminal. Alternatively, the processor 1100 and the storage media may reside as individual components in a user terminal.

As set forth above, when the driver has an intention to change driving lanes while a vehicle is being driven, the lane change may be executed based on the driver intention by determining and reflecting the driver intention using the sensor mounted in the gear lever, thus improving driver convenience.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A lane change system, comprising:
   a sensor unit configured to sense a rotational angular velocity of a turn signal lever of a subject vehicle, an electric field signal of a gear lever of the subject vehicle, and distances between the subject vehicle and neighboring vehicles; and a processor configured to set a driving mode using the rotational angular velocity, the electric field signal, and the distances between the subject vehicle and the neighboring vehicles, which are sensed by the sensor unit, generate a lane change path based on the driving mode, and execute a lane change of the subject vehicle.

2. The lane change system according to claim 1, wherein the sensor unit includes:

an angular velocity sensor configured to sense the rotational angular velocity of the turn signal lever; and an electric field signal sensor configured to sense the electric field signal generated due to manipulation the gear lever.

3. The lane change system according to claim 2, wherein the angular velocity sensor is mounted in the turn signal lever and the electric field signal sensor is mounted in the gear lever.

4. The lane change system according to claim 2, wherein the sensor unit further includes:

an omnidirectional sensor configured to sense speeds of the neighboring vehicles located ahead, behind, and to the side of the subject vehicle and distances between the subject vehicle and the neighboring vehicles.

5. The lane change system according to claim 4, wherein the driving mode is divided into a first driving mode in which a rapid lane change is execute, a second driving mode in which a lane change slower than that in the first driving mode is executed, and a third driving mode in which a lane change slower than that in the second driving mode is executed.

6. The lane change system according to claim 5, wherein the processor includes:

a driving mode setting unit configured to set the driving mode using the rotational angular velocity, the electric field signal, and sensing results of the omnidirectional sensor;

a lane change path generating unit configured to generate a lane change path based on the driving mode; and a lane change controller configured to execute the lane change based on the lane change path.

7. The lane change system according to claim 6, wherein the driving mode setting unit is configured to set the first driving mode when the rotational angular velocity is greater than or equal to a first reference value, and set the second driving mode when the rotational angular velocity is greater than or equal to a second reference value and is less than the first reference value.

8. The lane change system according to claim 7, wherein the driving mode setting unit is configured to set the first driving mode when a period of time for which the electric field signal is generated is less than a third reference value, and set the second driving mode when the period of time for which the electric field signal is generated is greater than or equal to the third reference value and is less than a fourth reference value.

9. The lane change system according to claim 8, wherein the driving mode setting unit is configured to calculate a probability of a collision and a change allowable time based on the sensing results of the omnidirectional sensor including the speeds of the neighboring vehicles traveling ahead, behind, and to the side of the subject vehicle on a target road lane and the distances between the subject vehicle and the neighboring vehicles, and set the first driving mode when the probability of the collision is high and the change allowable time is short.

10. The lane change system according to claim 9, wherein the driving mode setting unit is configured to set the third driving mode when the rotational angular velocity is greater than or equal to the second reference value, when the period of time for which the electric field signal is generated is greater than or equal to the fourth reference value, or when the probability of the collision is low and the change allowable time is long based on the sensing results of the omnidirectional sensor.

11. The lane change system according to claim 6, wherein the driving mode setting unit is configured to determine a driver intention using the rotational angular velocity and the electric field signal, and set the driving mode by prioritizing the driver intention over the sensing results of the omnidirectional sensor.

12. The lane change system according to claim 6, wherein the driving mode setting unit is configured to determine the driving mode by sensing a contact time of the manipulation of the gear lever using the period of time for which the electric field signal is generated.

13. The lane change system according to claim 12, wherein the driving mode setting unit is configured to set the first driving mode when the period of time for which the electric field signal is generated is short, set the second driving mode when the period of time for which the electric field signal is generated is longer than that in the first driving mode, and set the third driving mode when the period of time for which the electric field signal is generated is longer than that in the second driving mode.

14. A lane change device, comprising:

a driving mode setting unit configured to set a driving mode using a rotational angular velocity of a turn signal lever, an electric field signal of a gear lever, and a probability of a collision with a neighboring vehicle;

a lane change path generating unit configured to generate a lane change path based on the driving mode; and a lane change controller configured to execute a lane change based on the lane change path.

15. The lane change device according to claim 14, wherein the driving mode is divided into a first driving mode in which a rapid lane change is executed, a second driving mode in which a lane change slower than that in the first driving mode is executed, and a third driving mode in which a lane change slower than that in the second driving mode is executed.

16. A lane change method, comprising:

receiving, by a processor of a controller, a rotational angular velocity of a turn signal lever, an electric field signal generated when a gear lever is manipulated, and omnidirectional sensing data;

setting, by the processor, a driving mode using the rotational angular velocity, the electric field signal, and the omnidirectional sensing data;

generating, by the processor, a lane change path based on the driving mode; and executing, by the controller, a lane change based on the lane change path.

17. The lane change method according to claim 16, wherein the driving mode is set by dividing the driving mode into a first driving mode in which a rapid lane change is executed, a second driving mode in which a lane change slower than that in the first driving mode is executed, and a third driving mode in which a lane change slower than that in the second driving mode is executed.

18. The lane change method according to claim 17, wherein the setting of the driving mode includes:
  setting, by the processor, the first driving mode when the rotational angular velocity is greater than or equal to a first reference value; and
  setting, by the processor, the second driving mode when the rotational angular velocity is greater than or equal to a second reference value and is less than the first reference value.

19. The lane change method according to claim 18, wherein the setting of the driving mode includes:
  setting, by the processor, the first driving mode when a period of time for which the electric field signal is generated is less than a third reference value; and
  setting, by the processor, the second driving mode when the period of time for which the electric field signal is generated is greater than or equal to the third reference value and is less than a fourth reference value.

20. The lane change method according to claim 19, wherein the setting of the driving mode includes:
  calculating, by the processor, a probability of a collision and a change allowable time based on the omnidirectional sensing data including speeds of neighboring vehicles located ahead, behind, and to the side of a subject vehicle on a target lane and distances between the subject vehicle and the neighboring vehicles; and
  setting, by the processor, the first driving mode when the probability of the collision is high and the change allowable time is short.

* * * * *